United States Patent [19]
Elliott

[11] Patent Number: 6,127,863
[45] Date of Patent: Oct. 3, 2000

[54] EFFICIENT FRACTIONAL DIVIDER

[75] Inventor: Paul M. Elliott, Jenner, Calif.

[73] Assignee: Cisco Systems, Inc., San Jose, Calif.

[21] Appl. No.: 09/282,387

[22] Filed: Mar. 31, 1999

[51] Int. Cl.[7] .................................................. H03K 21/00
[52] U.S. Cl. ............................................. 327/115; 377/48
[58] Field of Search ................................ 377/48; 327/115

[56] References Cited

U.S. PATENT DOCUMENTS

| | | | |
|---|---|---|---|
| 4,965,531 | 10/1990 | Riley | 331/1 A |
| 5,088,057 | 2/1992 | Amrany et al. | 364/703 |

*Primary Examiner*—Margaret R. Wambach
*Attorney, Agent, or Firm*—Skjerven Morrill MacPherson LLP; Tom Chen

[57] ABSTRACT

In accordance with the invention, a method and structure are provided for obtaining a ratio of $M/(2^N+K)$ by feeding various carry-out (and/or complemented carry-out) signals from full-adders back to various frequency control inputs of the full-adders to modify the denominator of the division ratio. By doing this, K additional or fewer counts are accumulated during each cycle. Thus, the denominator can be changed from $2^N$ to $2^N+K$, where K can be either positive or negative to obtain the desired $M/(2^N+K)$ ratio.

17 Claims, 4 Drawing Sheets

EFFICIENT FRACTIONAL DIVIDER

BACKGROUND

1. Field of the Invention

This invention relates generally to digital design and frequency synthesis and, in particular, to a numerically controlled oscillator.

2. Description of Related Art

In digital design, it is often necessary to derive an output signal from a given input signal such that the ratio of the output to the input is some specific ratio. In many cases, the ratio is in the form of 1/N, where N is an integer. Digital divider circuits for performing this "divide-by-N" function are well known in the art, such as circuits for generating one output pulse for every N input pulses. In other cases, the desired ratio is in the form of $M/2^N$, where M is an integer, and $2^N$ is an integer power of two (i.e., 2, 4, 8, 16, etc.) and greater than M. Many types of circuits for performing the $M/2^N$ division are also known, such as a numerically controlled oscillator (NCO).

FIG. 1 shows a conventional N-bit NCO 100, which includes of an N-bit adder 110 and an N-bit register or accumulator 120 for storing the summed outputs from adder 110. Inputs $B_0$ to $B_{N-1}$ of adder 110 are coupled to a selection circuit (not shown) for frequency selection, and inputs $A_0$ to $A_{N-1}$ of adder 110 are connected to the N outputs of accumulator 120. The output $Y_0$ to $Y_{N-1}$ of adder 110 is the sum of $A_i$ and $B_i$, where i=0 to N-1, i.e., $Y_0=A_0+B_0$, $Y_1=A_1+B_1$, ..., $Y_{N-1}=A_{N-1}+B_{N-1}$, which is stored in accumulator 120 at a rate determined by an external clock coupled to accumulator 120. The most significant bit (MSB) of accumulator 120, i.e., from $Y_{N-1}$, represents the output of NCO 100. NCO 100 outputs a pulse M times for every $2^N$ clock cycles, where M is the frequency control value and N is the number of bits in the accumulator. More specifically, $B_{N-1}B_{N-2}...B_1B_0$ is the binary representation of the value M.

FIG. 2 shows a 3-bit NCO 200, which will be used to illustrate the operation of an NCO. A 3-bit frequency control signal, $B_2B_1B_0$, allows a given input clock frequency to be changed by four ($2^2$) different ratios to provide for four different output frequencies. An NCO typically utilizes signed 2's complement arithmetic so that the MSB, i.e. bit $B_2$ in this case, is used as the sign bit. Therefore, there are four possible frequency ratios for the input clock, 0, 1/8, 2/8, and 3/8. For example, to obtain a 3/8 division of the input signal, the frequency control signal $B_2B_1B_0$ is set to 011. FIG. 3 shows signal waveforms for the clock and for register outputs $A_0$, $A_1$, and $A_2$. Assume that signals from a 3-bit adder 210 are clocked into a 3-bit accumulator 220 on each low to high transition of the clock pulses and that accumulator 220 has been cleared so that zeros are stored in accumulator 220. After the first transition 301 of the clock pulse, the output of accumulator 220 will all be low or zero. The second low to high transition 302 of the clock signal will cause the signal on the frequency select input of adder 210 ($B_2B_1B_0$=011) to be added to the output of accumulator 220 ($A_2A_1A_0$=000) and result stored into accumulator 220. Thus, the output of accumulator 220 will now be $A_2A_1A_0$= 011, which represents the decimal number 3. At the third low to high transition 303 of the clock signal, accumulator 220 receives an input which is the sum of the 011 frequency select signal and the 011 output from accumulator 220. The binary number for this sum is 110, which represents a decimal 6. Addition continues for a total of N or 8 clock cycles, at which time, the waveforms for the signals at A0, A1, and A2 repeat. Thus, as seen, the most significant bit (i.e., at A2) transitions or toggles high three times during the 8-pulse clock cycle for the desired 3/8 division.

General NCOs, such as in FIG. 1, distribute the output pulses as uniformly as possible for a given $M/2^N$ ratio, which is advantageous for frequency synthesis. However, there are other cases where the desired ratio expressed as M/N, where M and N are both integers, with M being less than N, and N not being a power of two. In these cases, the general NCO designs of FIG. 1 cannot generate the exact desired ratio. In order to generate an exact M/N ratio, the general NCO has been modified and varied, such as disclosed in U.S. Pat. No. 5,521,534, entitled "Numerically Controlled Oscillator for Generating a Digitally Represented Sine Wave Output Signal", to Elliott. However, these designs tend to be complex and/or slow.

Accordingly, a divider circuit for generating M/N ratios is desired that overcomes the deficiencies of conventional NCO circuits discussed above.

SUMMARY

In accordance with the present invention, a method and structure are provided which allows ratios of $M/(2^N+K)$ to be obtained, where K can be either positive or negative. A numerically controlled oscillator (NCO)-based fractional divider (also referred to herein as an efficient fractional divider (EFD)) utilizes the carry-out signals from adders in the NCO as feedback signals to the frequency control input of the adders. By selectively choosing carry-out signals or complemented carry-out signals as inputs to selected frequency control inputs, the denominator of the division can be increased or decreased to a desired ratio. Thus, depending on how much the denominator $2^N$ is increased or decreased, more generalized ratios of $M/(2^N+K)$ can be quickly and simply obtained.

The denominator can be effectively decreased by replacing an existing '0' in the binary numerator with a carry-out signal. The denominator can be increased by replacing an existing '1' in the binary numerator with a complemented carry-out signal. This is performed by feeding intermediate carry-out signals, or their complements, from the EFD adder structure back into the frequency control inputs of the individual adders. By doing this, the EFD accumulates K additional or fewer counts during each cycle of the accumulator to obtain the desired ratio.

To add "-1" to the denominator, the carry-out of the full-adder representing the most significant bit is fed back to the frequency control input of the full-adder representing the least significant bit. To add "+1" to the denominator, the complemented carry-out of the full-adder representing the most significant bit is fed back to the frequency control input of the first full-adder. To add "-2" or "+2" to the denominator, the most significant carry-out or its complement, respectively, is fed back to the frequency control input of the full-adder representing the next most significant bit. The value subtracted or added continues to double as the most significant carry-out or its complement, respectively, is fed back to the frequency control input of successive full-adders representing successively more significant bits.

Similarly, feedback from the carry-out or complemented carry-out of the full-adder representing the second most significant bit will add "-2" or "+2" when connected to the frequency control input of the full-adder representing the least significant bit. The value subtracted or added continues to double as this carry-out signal (or its complement) is fed back to the frequency control inputs of full-adders representing successively more significant bits. In like manner, carry-out signals down to the carry-out signal of the full-adder representing the second least significant bit can be fed back to frequency control inputs to increase or decrease the denominator as desired. The feedback paths are limited by the following restriction: feedback cannot be taken from outputs that are less significant than the most significant non-zero frequency control input term.

A ratio of $M/(2^N+K)$ can be obtained by first decomposing the denominator $2^N+K$ into powers of two, i.e., i.e., $$2^N + K = \sum_{i=0}^{N} A_i 2^i.$$

Next, the numerator M is decomposed into powers of two, i.e., $$M = \sum_{i=0}^{N-1} J_i 2^i.$$

Then, using the non-zero $A_i$ terms for i=0 to N−1 in conjunction with whether a particular $J_i$ is '0' or '1', the necessary feedback connections can be made from the carry-out signals to the frequency control inputs to increase or decrease the denominator to the desired value of $2^N+K$. The resulting EFD is thus able to perform the desired division.

The present invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with the present invention, a numerically controlled oscillator (NCO) based fractional divider (also referred to herein as an efficient fractional divider (EFD)) utilizes the carry-out signals from adders in the NCO as feedback inputs to the frequency control input of the adders. By selectively choosing carry-out signals or complemented carry-out signals as inputs to selected frequency control inputs, the denominator of the division can be increased or decreased to a desired ratio. The EFD is based on the NCO, but where conventional NCOs can perform division in the ratio of $M/2^N$, the EFD can perform division with the ratio of $M/(2^N+K)$ for certain values of M and K. Thus, depending on the value K, more generalized ratios of M/N can be quickly and simply obtained. The following figures illustrate the development of the EFD of the present invention.

Figure 4:
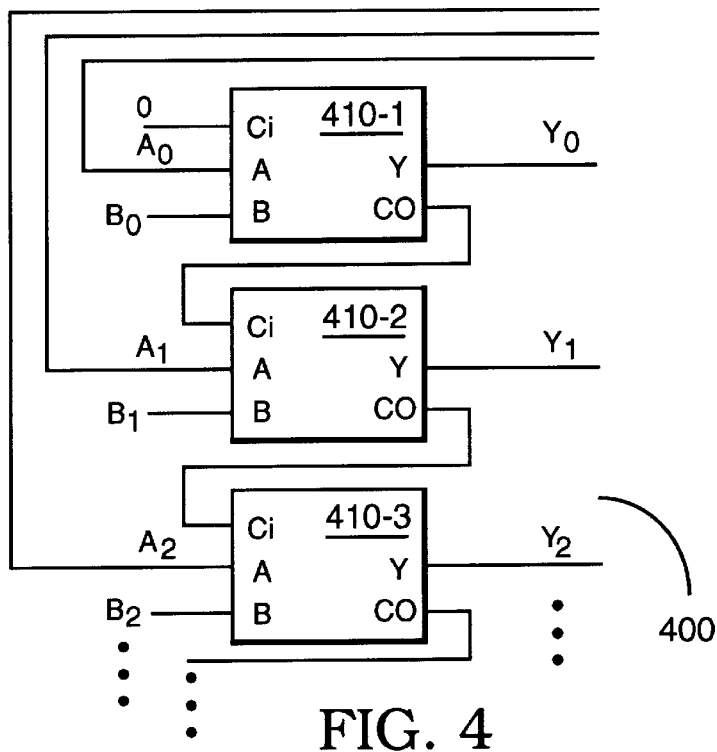
FIG. 4 shows a portion of an NCO utilizing a ripple-carry adder structure.

FIG. 4 shows a portion of an NCO 400 utilizing a ripple-carry adder structure. NCO 400 includes N full-adders 410. In parallel, bits $A_0$ and $B_0$ are applied to a first full-adder 410-1, bits $A_1$ and $B_1$ are applied to a second full-adder 410-2, etc. As discussed earlier, bits $A_0$ to $A_{N-1}$ represent the feedback from associated accumulators (not shown), and bits $B_0$ to $B_{N-1}$ represent the frequency control for the desired conversion ratio. The third input (carry input) to each of the full-adders is coupled to the carry output from a corresponding previous full-adder, with the carry input of the first full-adder 410-1 connected to a logic '0', e.g., ground. The resultant sum $Y_{N+1} \ldots Y_0$ is then obtained after carry bits have rippled or propagated through the chain of full-adders to full-adder 410-N.

The output Y is stored in a clocked accumulator and fed back to the full-adders as the A input bits. Again, the most significant bit of the output represents the desired division.

Figure 1:
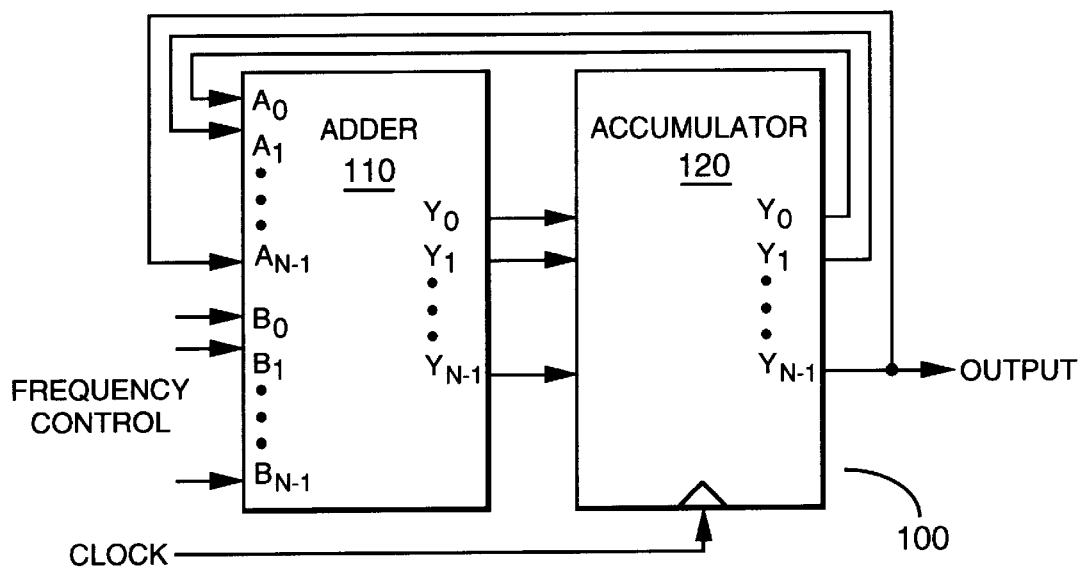
FIG. 1 shows a conventional N-bit numerically controlled oscillator (NCO) for performing a "power-of-two" division.
Figure 2:
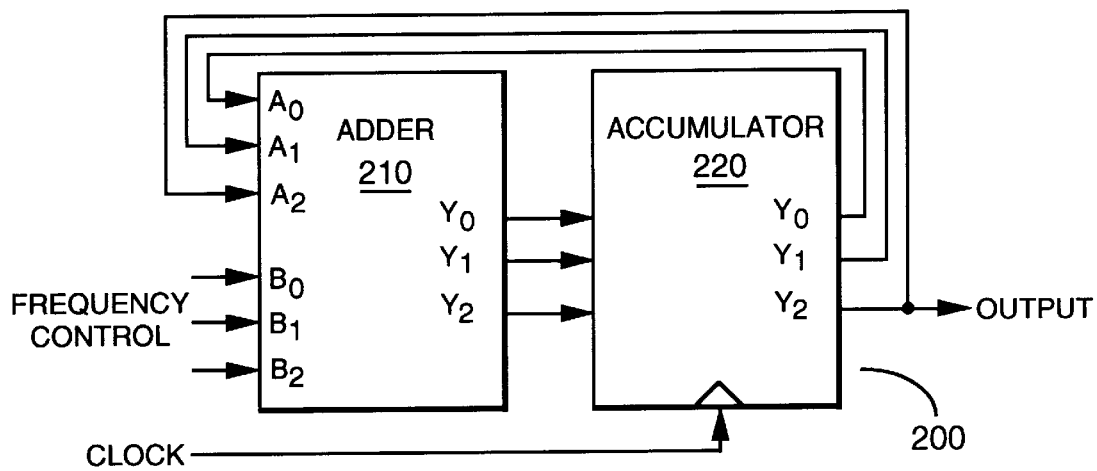
FIG. 2 shows a 3-bit NCO of FIG. 1.
Figure 3:
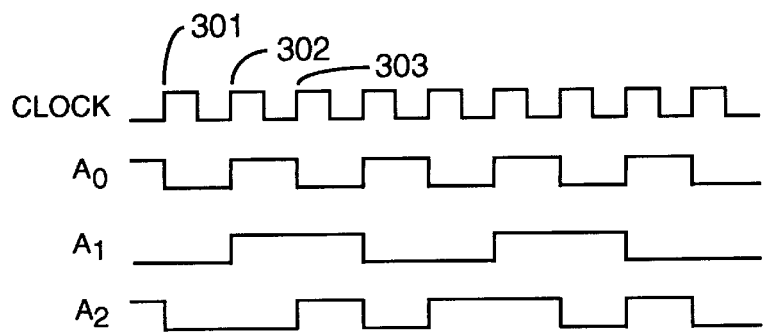
FIG. 3 shows a timing diagram of the NCO of FIG. 2 for performing a 3/8 division.
Figure 5:
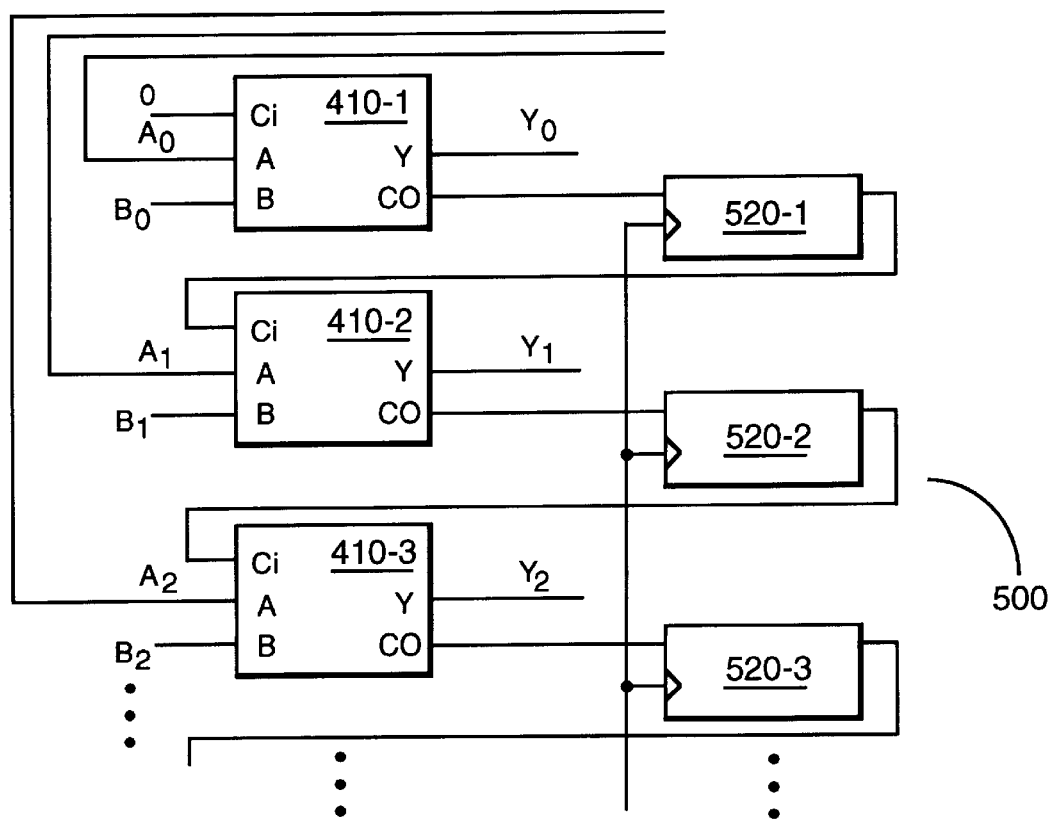
FIG. 5 shows a portion of an NCO utilizing a pipelined adder structure.

In other embodiments, the NCO can utilize a carry look-ahead adder structure (with intermediate carry propagate and carry generate bits) instead of a ripple-carry structure for reducing the carry propagation delay, or a pipelined adder structure 500, as shown in FIG. 5, can be used to increase the speed of the NCO. Registers or accumulators 520 are coupled between the carry output and the carry input of successive full-adders 410. Accumulators 520 allow NCO 500 to operate at high speeds by reducing the number of logic stages that the carry signals must propagate between clock cycles. Note that accumulators 520 do not perform the same function as the accumulators for the NCO described with respect to FIG. 1. Specifically, accumulators 520 do not store the sums from the full-adders. The addition of the pipelined carry stages causes the adder to operate in an "out-of-phase" manner, where both the parallel inputs and parallel outputs are delayed by differing amounts for each stage. This can be compensated for by adding additional input and output delay registers if desired.

Figure 6:
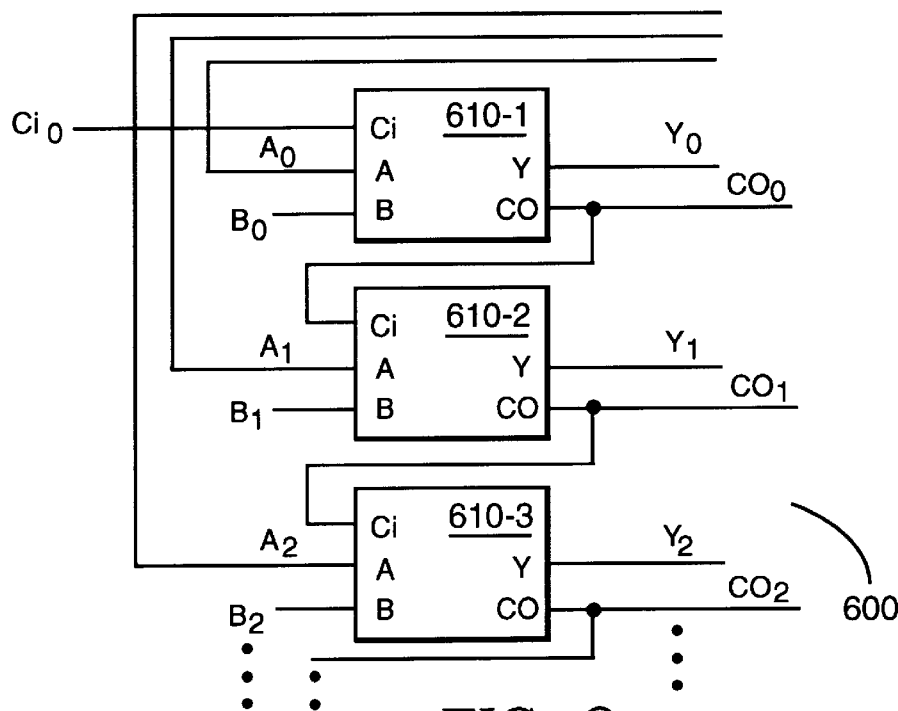
FIG. 6 shows a portion of an with an adder having accessible carry-out signals and an accessible carry-in for the first stage.

According to the present invention, carry-out signals are fed back into the frequency control inputs of the full-adders in order to modify the denominator of the division ratio. FIG. 6 shows a portion of an NCO 600 with an adder having accessible carry-out signals, as well as an accessible carry-in for the first stage or adder 410-1 of the NCO. The carry-out signals are used by the EFD to effectively change the denominator from $2^N$ to $2^N+K$, where K can be either positive or negative.

Figure 7:
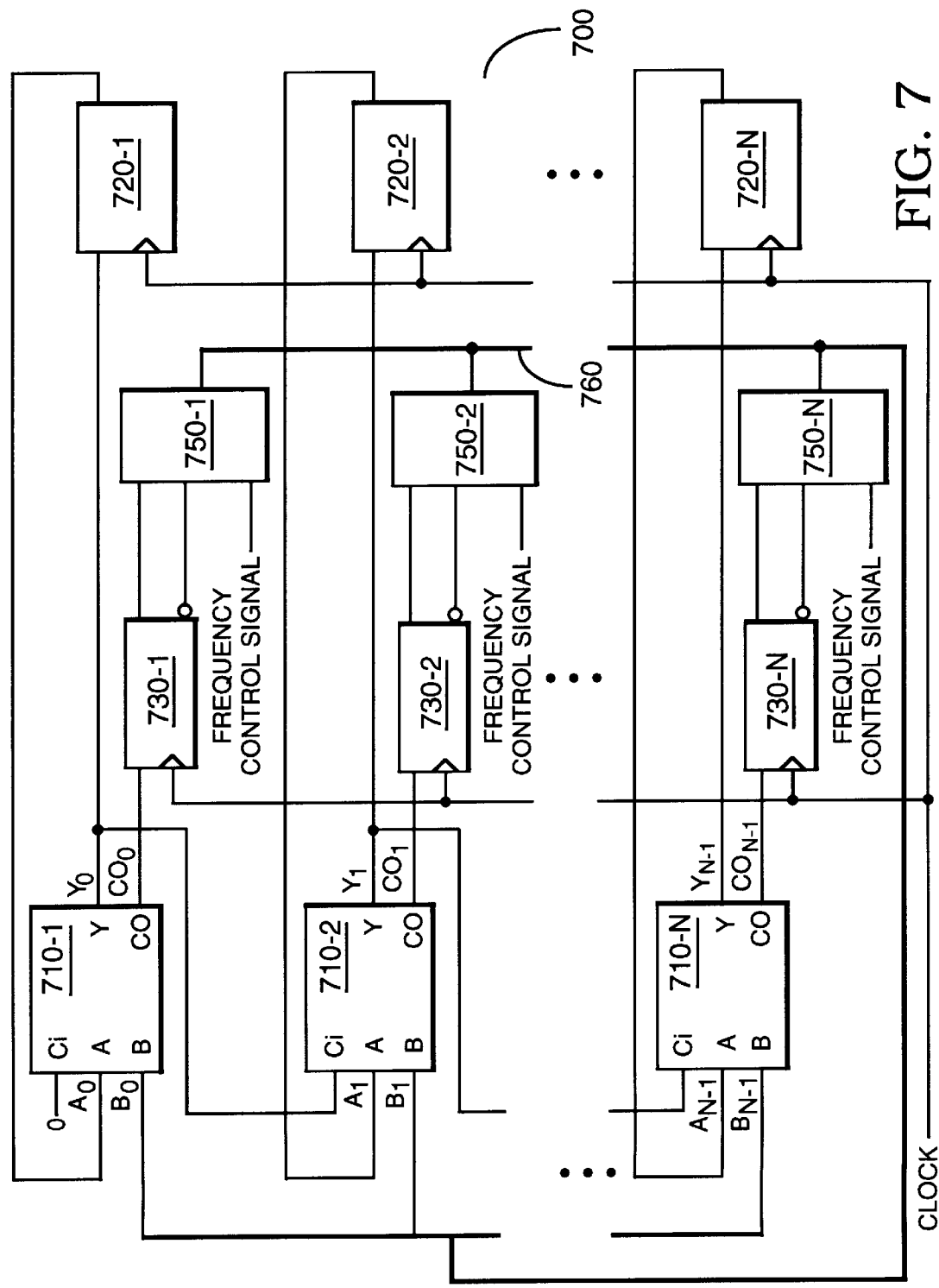
FIG. 7 shows a generalized "Efficient Fractional Divider" (EFD) according to one embodiment of the present invention.

FIG. 7 shows the generalized EFD structure of the present invention. EFD 700 includes N full-adders 710, where the output Y of each full-adder is coupled to an associated one of N registers or accumulators 720, as with conventional NCOs. The output of each accumulator 720 is fed back into an input of a corresponding full-adder 710, i.e., the output of accumulator 720-1 is fed back into the $A_0$ input of full-adder 710-1, ..., and the output of accumulator 720-N is fed back into the $A_{N-1}$ input of full-adder 710-N. However, unlike conventional NCOs, EFD 700 also includes another series of registers or accumulators 730 to 730-N coupling the carry-out signals or complemented carry-out signals of full-adders 710 back to selected ones of frequency control inputs $B_{N-1}$ to $B_0$ of full-adders 710. Associated switches or multiplexers 750-1 to 750-N select whether the carry-out signals, complemented carry-out signals, or external frequency control signals are fed back to the frequency control inputs. A bus 760 then carries the N signals back to the frequency control inputs of full-adders 710-1 to 710-N for selected use, based on the desired division. A common external clock source is used to clock accumulators 720 and 730. Again, the accumulator carrying the most significant bit (e.g., accumulator 720-N) provides the output to EFD 700.

Depending on the feedback paths from accumulators 730 to the frequency control inputs of full-adders 710 the effective denominator can be increased or decreased to obtain a desired conversion ratio. The EFD feedback paths are chosen in conjunction with the numerator input value. It is possible to increase the effective denominator (as shown in the examples below) by replacing an existing '1' in a numerator with a complemented carry-out signal. It is possible to decrease the effective denominator by replacing an existing '0' in a numerator with a carry-out signal. This is performed by feeding intermediate carry-out signals, or their complements, from the EFD adder structure back into the accumulator. By doing this, the EFD accumulates K additional or fewer counts during each cycle of the accumulator. These carry-out signals are re-clocked through a register to break combinatorial feedback loops, as shown in FIG. 7. Note that if the pipelined-carry adder of FIG. 5 is used, the re-clocking of the carry-out feedback signals is performed by the pipeline registers and additional re-clocking is not required.

To add "−1" to the denominator (i.e., subtraction), the carry-out of the full-adder representing the most significant bit (i.e., the carry-out of full-adder 710-N, denoted $CO_{N-1}$) is fed back to the frequency control input of the full-adder representing the least significant bit (i.e., the frequency control input of full-adder 710-1, denoted $B_0$). To add "+1" to the denominator, the complemented carry-out of the full-adder representing the most significant bit ($\overline{CO_{N-1}}$) is fed back to the frequency control input ($B_0$) of the first full-adder 710-1. To add "−2" or "+2" to the denominator, $CO_{n-1}$ or $\overline{CO_{N-1}}$, respectively, is fed back to the frequency control input $B_1$ of the second full-adder 710-2 representing the next most significant bit. The value subtracted or added continues to double as $CO_{N-1}$ or $\overline{CO_{N-1}}$ is fed back to the frequency control input of successive full-adders representing successively more significant bits, ending at frequency control input $B_{N-2}$ of full-adder 710-(N−1).

Similarly, feedback from the carry-out or complemented carry-out of the full-adder representing the second most significant bit (i.e., $CO_{N-2}$ or $\overline{CO_{N-2}}$ of full-adder 710-(N−1)) will add "−2" or "+2" when connected to the frequency control input $B_0$ of the full-adder 710-1 representing the least significant bit. The value subtracted or added continues to double as the $CO_{N-2}$ or $\overline{CO_{N-2}}$ signals are fed back to the frequency control inputs of full-adders representing successively more significant bits. The feedback paths are limited by the following restriction: feedback cannot be taken from outputs that are less significant than the most significant non-zero (i.e., feedback input or '1') frequency control input term. For example, if the frequency control input $B_7$ of full-adder 710-8 is the most significant non-zero frequency input term, i.e., $B_7$ is coupled to a feedback signal or a '1' and frequency inputs $B_8$ to $B_{N-1}$ are coupled to a '0', then the carry-out signals $CO_8$ to $CO_{N-1}$ of full-adders 710-9 to 710-(N−1) can be used as feedback signals to frequency control inputs $B_0$ to $B_7$ of full-adders 710-1 to 710-8. This restriction allows easy design of the EFD in terms of controlling the rate at which the pulse rate of the input clock changes. The pulse rate doubles with each preceding or less significant stage if these stages have a '0' coupled to the frequency control input.

By reviewing the available combination of feedback paths and values that can be added to or subtracted from the denominator, it is usually possible to find a combination that will give the desired ratio. Table 1 below shows the possible feedback connections and weightings for a six-stage EFD:

TABLE 1

|  | $B_4$ | $B_3$ | $B_2$ | $B_1$ | $B_0$ |
|---|---|---|---|---|---|
| $CO_5$ | 16 | 8 | 4 | 2 | 1 |
| $CO_4$ |  | 16 | 8 | 4 | 2 |
| $CO_3$ |  |  | 16 | 8 | 4 |
| $CO_2$ |  |  |  | 16 | 8 |
| $CO_1$ |  |  |  |  | 16 |

In general, the feedback connections for EFD 700 can be obtained to generate a ratio of $M/(2^N+K)$ according to the following, where K can be either positive or negative:

1) Decompose the denominator into powers of two, i.e., $$2^N + K = \sum_{i=0}^{N} A_i 2^i.$$

The number of stages or full-adders for the EFD is at least N.

2) Decompose the numerator into powers of two, i.e., $$M = \sum_{i=0}^{N-1} J_i 2^i.$$

The values of $J_i$ indicate the initial voltages applied to the corresponding frequency control inputs $B_i$, where i=0 to N−1, i.e., when $J_i=0$, a ground potential is applied to $B_i$, and when $J_i=1$, a positive or high potential is applied to $B_i$.

3) Using the non-zero $A_i$ terms for i=0 to N−1 (from step (1)), the necessary feedback connections can be made from the carry-out signal of accumulators 730 to the frequency control inputs of full-adders 710. The feedback paths alter the $B_i$ connections from step (2) to modify the numerator, which effectively modifies the denominator to the desired ratio.

The following two examples illustrate the use of the EFD for obtaining ratios not possible with conventional "power-of-two" NCOs.

EXAMPLE 1

To generate an output that is 3/10 the frequency of an input clock (i.e., a 3/10 ratio):

1) Decompose the denominator into powers of two:
   $10 = 8 + 2 = 2^3 + 2^1$

Thus, EFD must contain at least 3 stages, since $2^3$ is equal to the largest term, which indicates that a 3-bit EFD can most likely be used.

2) Decompose the numerator into powers of two:
   $3 = 2 + 1 = 0*2^2 + 1*2^1 + 1*2^0 = 011$ (binary form)

A 3-bit "power of two" NCO, when fed an input value of 3, will generate an output signal that is 3/8 of the input clock. Thus, initially, the frequency control inputs of the three full-adders will be coupled to logic 0's and 1's as shown in Table 2 below.

TABLE 2

| $B_2$ | $B_1$ | $B_0$ |
|---|---|---|
| 0 | 1 | 1 |

3) Use the non-zero terms after the most significant term from step (1), which in this case is only the $2^1$ term. Thus, a '2' must be added to the denominator to obtain the desired 3/10 ratio. Table 3 below shows the feedback paths and weights for a three-stage EFD.

TABLE 3

|  | $B_1$ | $B_0$ |
|---|---|---|
| $CO_2$ | 2 | 1 |
| $CO_1$ |  | 2 |

As seen from Table 3, to add a "2", the carry-out $CO_2$ of the most significant full-adder, i.e., 710-3, is fed back to the frequency control input $B_1$ of the second full-adder 710-2 (shown in FIG. 8), or the carry-out $CO_1$ of the second full-adder 710-2 is fed back to the frequency control input $B_0$ of the least significant full-adder 710-1 since both the $B_1$ and $B_0$ inputs are initially coupled to '1'. Furthermore, because "+2" is to be added, the carry-out signal is first complemented before feedback. As a result, the numerator is equal to $(7/10)*2^1+1*2^0$, which, with a denominator of 8 ($2^3$), gives a ratio of $[(14/10)+1]/8$, which is equal to 3/10. 3/10 represents carry-out $CO_2$ driven high three times every 10 clock cycles, and thus, inverting this signal provides the ratio of 7/10 (driven high seven times every 10 clock cycles).

Thus, the EFD in this example will effectively increase the denominator from 8 to 10 by reducing the numerator from 3 to 2.4. However, it is more convenient to consider that the denominator has been directly modified, and in this case, the effective denominator has been increased by 2, from 8 to 10. The carry-out feedback signal must run through a clocked element to break a combinatorial feedback path. This clocking can be done by the use of the pipelined NCO, or by a separate register.

Figure 8:
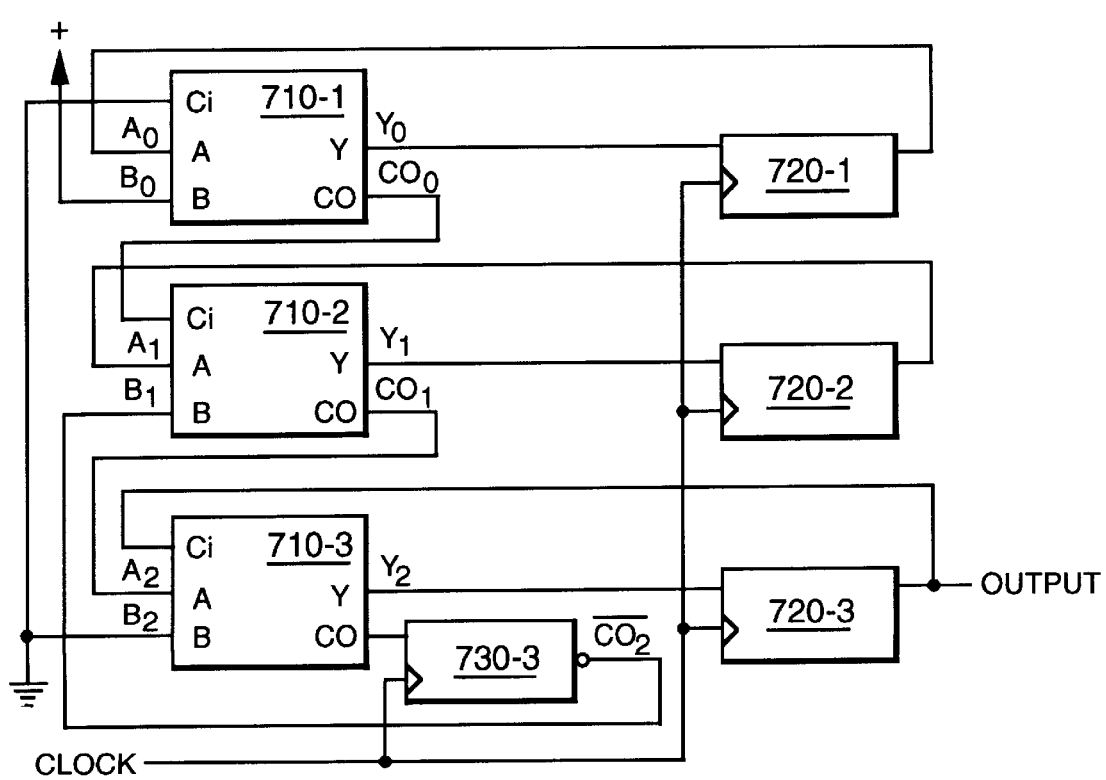
FIG. 8 shows an EFD for performing a 3/10 division according to one embodiment of the present invention.

It should be noted here that the EFD structure of FIG. 7 is a generalized structure so that once the desired feedback paths are determined, the connections can be made directly without the need for switches or multiplexers, and unneeded accumulators 730 can be omitted, as shown in FIG. 8, thereby reducing the circuit size. However, by selectively including only desired accumulators and making connections specific to a desired ratio, the resulting EFD is application specific.

EXAMPLE 2

A more typical use of the EFD is the generation of a DS3 clock (44.736 MHz) from a SONET STS-3 input clock (155.52 MHz). Therefore, the necessary divider ratio is 44736/155520, which reduces to 699/2430. The denominator 2430 is not a power of two, so a traditional NCO cannot be used to exactly generate this frequency ratio. The EFD of the present invention, however, can be configured to perform this division, as shown below:

1) Decompose the denominator into powers of two:
2430=2048+256+128−2

This indicates than at least an 11-bit EFD must be used because $2_{11}=2048$.

2) Decompose the numerator into powers of two:
$699=512+128+32+16+8+2+1=0*2^{10}+1*2^9+0*2^{8+}$
$1*2^7+0*2^6+1*2^5+1*2^4+1*2^3+0*2^2+1*2^1+1*2^0=$
01010111011

Thus, the inputs to an 11-bit EFD will have initial logic inputs as shown in Table 4 below.

TABLE 4

| $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|
| 0 | 1 | 0 | 1 | 0 | 1 | 1 | 1 | 0 | 1 | 1 |

3) Use the non-zero terms after the most significant term from step (1), which in this case are "+256", "+128", and "−2", to select feedback connections from the carry-out signals of the EFD to modify the denominator. Table 5 below shows the feedback paths and weights for an eleven-stage EFD.

TABLE 5

|  | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|
| $CO_{10}$ | 512 | 256 | 128 | 64 | 32 | 16 | 8 | 4 | 2 | 1 |
| $CO_9$ |  | 512 | 256 | 128 | 64 | 32 | 16 | 8 | 4 | 2 |
| $CO_8$ |  |  | 512 | 256 | 128 | 64 | 32 | 16 | 8 | 4 |
| $CO_7$ |  |  |  | 512 | 256 | 128 | 64 | 32 | 16 | 8 |
| $CO_6$ |  |  |  |  | 512 | 256 | 128 | 64 | 32 | 16 |
| $CO_5$ |  |  |  |  |  | 512 | 256 | 128 | 64 | 32 |
| $CO_4$ |  |  |  |  |  |  | 512 | 256 | 128 | 64 |
| $CO_3$ |  |  |  |  |  |  |  | 512 | 256 | 128 |
| $CO_2$ |  |  |  |  |  |  |  |  | 512 | 256 |
| $CO_1$ |  |  |  |  |  |  |  |  |  | 512 |

As seen from Table 5, there are numerous possible feedback connections to generate the "+256", "+128", and "−2" terms. However, according to the limitation described above with respect to possible feedback paths, the actual number of possible connections is smaller. As seen from Table 4, frequency control input $B_9$ is coupled to a '1'. Thus, the least significant carry-out signal to be used as a feedback is the $CO_9$ signal, i.e., the signals $CO_1$ to $CO_8$ are not available for use as feedback signals. In Table 4, the carry-out signals under the darkened line are unavailable. With this restriction, the "+256" term can only be generated by connecting the complement of carry-out $C_9$ of full-adder 710-10 back to the frequency control input $B_7$ of full-adder 710-8 (to replace the original '1'). (The $CO_{10}$ signal cannot generate the "+256" term because the $B_8$ input is originally connected to a '0', as seen from Table 4). The "+128" term can only be generated by connecting the complement of carry-out $C_{10}$ of full-adder 710-10 back to the frequency control input $B_7$ of full-adder 710-7 (to replace the original '1'). However, input $B_7$ is also connected to the feedback signal $CO_9$ to generate the "+256" term. Therefore, the division is not capable with an 11-bit EFD.

The denominator can also be decomposed as follows:

1) 2430=4096−1024−512−128−2 .

This indicates a possible 12-bit EFD since $2^{12}$=4096.

2) The numerator is decomposed as before, with the exception that an additional stage is added. Thus, the inputs to a 12-bit EFD are shown in Table 6 below.

TABLE 6

| $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|---|
| 0 | 0 | 1 | 0 | 1 | 0 | 1 | 1 | 1 | 0 | 1 | 1 |

3) Use the non-zero terms after the most significant term from step (1), which in this case are "−1024", "−512", "−128", and "−2", to select feedback connections from the carry-out signals of the EFD to modify the denominator. Table 7 below shows the feedback paths and weights for a 12-bit EFD.

TABLE 7

|  | $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|---|---|
| $CO_{11}$ | 1024 | 512 | 256 | 128 | 64 | 32 | 16 | 8 | 4 | 2 | 1 |
| $CO_{10}$ |  | 1024 | 512 | 256 | 128 | 64 | 32 | 16 | 8 | 4 | 2 |
| $CO_9$ |  |  | 1024 | 512 | 256 | 128 | 64 | 32 | 16 | 8 | 4 |
| $CO_8$ |  |  |  | 1024 | 512 | 256 | 128 | 64 | 32 | 16 | 8 |
| $CO_7$ |  |  |  |  | 1024 | 512 | 256 | 128 | 64 | 32 | 16 |
| $CO_6$ |  |  |  |  |  | 1024 | 512 | 256 | 128 | 64 | 32 |
| $CO_5$ |  |  |  |  |  |  | 1024 | 512 | 256 | 128 | 64 |
| $CO_4$ |  |  |  |  |  |  |  | 1024 | 512 | 256 | 128 |
| $CO_3$ |  |  |  |  |  |  |  |  | 1024 | 512 | 256 |
| $CO_2$ |  |  |  |  |  |  |  |  |  | 1024 | 512 |
| $CO_1$ |  |  |  |  |  |  |  |  |  |  | 1024 |

According to Table 6, the only carry-out signals available for feedback are $CO_9$, $CO_{10}$, and $CO_{11}$ because input $B_9$ is the most significant input coupled to a '1', i.e., similar to the discussion for the 11-bit EFD, carry-out signals $CO_1$ to $CO_8$ are not available for use as feedback signals. In Table 7, carry-out signals underneath the darkened line are unavailable. Referring to Table 7, the terms "−1024", "−512", "−128" and "−2" can be generated as follows. The "+1024" term can be generated by connecting the carry-signal $CO_{11}$ to input $B_{10}$, the "+512" term can be generated by connecting the carry-out signal $CO_{10}$ to input $B_8$, the "−128" term can be generated by connecting the carry-out signal $C_{10}$ also to input $B_6$, and the "−2" term can be generated by connecting the carry-out signal $CO_{10}$ to input $B_0$.

Thus, Table 6 can be modified with the inputs as shown in Table 8 below. Note that this is only one implementation of the desired 699/2430 ratio.

TABLE 8

| $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|---|
| 0 | $CO_{11}$ | 1 | $CO_{10}$ | 1 | $CO_{10}$ | 1 | 1 | 1 | 0 | 1 | $CO_{10}$ |

The effective denominator is now 4096−1024−512−128−2, which equals 2430, resulting in the desired ratio of 699/2430.

This design is easily implemented with the pipelined NCO structure, and, since the combinatorial logic paths are short, the circuit can operate at a high clock speed. Furthermore, in the example above, the divider ratio of 699/2430 can be easily modified to vary the output rate by varying the numerator, i.e., changing the frequency control inputs of non-feedback inputs to the full-adders. Continuing with the above example, several of the bits of the numerator are not affected by the EFD feedback paths. If the three least significant bits are made selectable (i.e., from full-adders 710-1 to 710-3), the numerator can take on the values of 696, 697, 698, 699, 700, 701, 702 and 703, while the denominator remains 2430. Even though the least significant bit (from full-adder 710-1) is being used for a feedback connection, the bit can be selectable using the carry-in input of full-adder 710-1 Thus, by applying various combinations of logic '0' and '1' to the three full-adders, the eight ($2^3$) values from 696 to 703 for the numerator can be obtained. These numerators can be selected to vary the output frequency in steps of approximately 411 ppm (parts-per-million) (i.e., 1/2430). Thus, this and many other ratios can be implemented according to the present invention.

Although the invention has been described with reference to particular embodiments, the description is only an example of the invention's application and should not be taken as a limitation. Various adaptations and combinations of features of the embodiments disclosed are within the scope of the invention as defined by the following claims.

I claim:

1. A fractional divider for generating an output frequency that is a ratio $M/(2^N+K)$ of an input clock frequency, comprising:

N full-adders, each full-adder having a carry-in input terminal, an addend input terminal, a frequency control input terminal, an output terminal, and a carry-out output terminal, wherein the carry-out output terminal is coupled to the carry-in input terminal of the next full-adder;

N first registers, each first register coupled between the output terminal and the addend input terminal of each corresponding N full-adder; and a plurality of second registers, each second register coupled between the carry-out output terminal and the frequency control input terminal of selected ones of the N-full adders to form feedback paths, wherein the output frequency is taken from the output of the last of the N first registers.

2. The divider of claim 1, wherein each second register only couples the carry-out output terminal of a first full-adder to the frequency control input of a second full-adder if the first full-adder represents a more significant bit than the second full-adder.

3. The divider of claim 1, wherein each second register outputs either the signal from the corresponding carry-out output terminal or its complement.

4. The divider of claim 1, further comprising a plurality of multiplexers coupled between the plurality of second registers and the frequency input terminals of the full-adders, wherein each multiplexer outputs either the signal from a corresponding carry-out output terminal, the complemented signal from the corresponding carry-out output terminal, or a frequency control signal.

5. The divider of claim 1, wherein the first and second registers have an input coupled to an input clock supplying the input clock frequency.

6. The divider of claim 1, wherein the plurality of second registers form feedback paths from the carry-out output terminal to the frequency control input terminal of selected full-adders, and wherein the feedback paths are only formed from full-adders that represent more significant bits than the full-adder representing the most significant bit having a non-zero signal coupled to the frequency control input terminal.

7. The divider of claim 1, wherein the feedback paths cause the divider to skip or add pulses to the input clock frequency.

8. A method of generating an output frequency from an input clock frequency using a plurality of full-adders, each full-adder having a carry-in input terminal coupled to a carry-out signal of a previous full-adder and an output signal coupled the an addend input of the same full-adder, the method comprising:

forming feedback paths by selectively coupling the carry-out signal of first full-adders to frequency control input terminals of second full-adders to skip or add pulses to the input clock frequency for generating the desired output frequency.

9. The method of claim 8, wherein the desired output frequency is a $M/(2^N+K)$ ratio of the input clock frequency, and selectively coupling changes the denominator $2^N$ by K by skipping or adding pulses.

10. The method of claim 9, where the selectively coupling comprises:

coupling the carry-out signal of first full-adders to the frequency control input terminal of second full-adders representing successively more significant bits to add successively more negative values to the denominator, wherein the value doubles when the carry-out signal of the first full-adders are coupled to the frequency control input terminals of the second full-adders representing successively more significant bits.

11. The method of claim 10, wherein the first full-adders represent bits more significant than the second full-adders.

12. The method of claim 11, wherein the second full-adders represent the most significant bits having a non-zero signal coupled to the frequency control input terminal.

13. The method of claim 9, where the selectively coupling comprises:

coupling the complemented carry-out signal of first full-adders to the frequency control input terminal of second full-adders representing successively more significant bits to add successively more positive values to the denominator, wherein the value doubles when the carry-out signal of the first full-adders is coupled to the frequency control input terminals of the second full-adders representing successively more significant bits.

14. The method of claim 13, wherein the first full-adders represent bits more significant than the second full-adders.

15. The method of claim 14, wherein the second full-adders represent the most significant bits having a non-zero signal coupled to the frequency control input terminal.

16. The method of claim 9, where the selectively coupling comprises:

coupling the frequency control input terminal of first full-adders to the carry-out signals of second full-adders representing successively more significant bits to add successively more negative values to the denominator, wherein the value doubles when the frequency control input terminal of the first full-adders are coupled to the carry-out signals of the second full-adders representing successively more significant bits.

17. The method of claim 9, where the selectively coupling comprises:

coupling the frequency control input terminal of first full-adders to the complemented carry-out signals of second full-adders representing successively more significant bits to add successively more positive values to the denominator, wherein the value doubles when the frequency control input terminal of the first full-adders are coupled to the complemented carry-out signals of the second full-adders representing successively more significant bits.

* * * * *